(12) United States Patent
Dill et al.

(10) Patent No.: US 7,730,013 B2
(45) Date of Patent: Jun. 1, 2010

(54) SYSTEM AND METHOD FOR SEARCHING DATES EFFICIENTLY IN A COLLECTION OF WEB DOCUMENTS

(75) Inventors: Stephen Dill, San Jose, CA (US); Madhukar R. Korupolu, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 11/259,664

(22) Filed: Oct. 25, 2005

(65) Prior Publication Data

US 2007/0094246 A1 Apr. 26, 2007

(51) Int. Cl.
*G06F 17/30* (2006.01)
*G06F 17/00* (2006.01)

(52) U.S. Cl. ............... 707/5; 704/1; 704/8; 704/9

(58) Field of Classification Search ............ 707/5, 707/6, 102, 105, 999.005, 999.006, 999.102, 707/999.105; 704/1, 8, 9
See application file for complete search history.

(56) References Cited

U.S. PATENT DOCUMENTS

| 6,144,963 | A | * | 11/2000 | Tsuda | 707/10 |
|---|---|---|---|---|---|
| 6,167,368 | A | * | 12/2000 | Wacholder | 704/9 |
| 6,249,765 | B1 | * | 6/2001 | Adler et al. | 704/500 |
| 7,107,528 | B2 | * | 9/2006 | Gerstl et al. | 715/534 |
| 2002/0143871 | A1 | * | 10/2002 | Meyer et al. | 709/204 |
| 2003/0200199 | A1 | * | 10/2003 | Snyder | 707/2 |
| 2003/0212649 | A1 | * | 11/2003 | Denesuk et al. | 707/1 |
| 2003/0212675 | A1 | * | 11/2003 | Denesuk et al. | 707/5 |
| 2003/0212699 | A1 | * | 11/2003 | Denesuk et al. | 707/102 |
| 2004/0123240 | A1 | * | 6/2004 | Gerstl et al. | 715/513 |
| 2005/0057584 | A1 | * | 3/2005 | Gruen et al. | 345/752 |
| 2005/0149858 | A1 | * | 7/2005 | Stern et al. | 715/513 |
| 2005/0177564 | A1 | | 8/2005 | Kobayashi et al. | |
| 2006/0101005 | A1 | * | 5/2006 | Yang et al. | 707/3 |
| 2006/0248456 | A1 | * | 11/2006 | Bender et al. | 715/531 |

FOREIGN PATENT DOCUMENTS

JP 2004141855 5/2004

OTHER PUBLICATIONS

"Date and Time Formats," W3C, Aug. 27, 1998, http://www.w3.org/TR/NOTE-datetime.*
"Convert HTML to text and remove markup," Jafsoft, Oct. 9, 2004, http://web.archive.org/web/20041009125145/http://www.jafsoft.com/detagger/.*

(Continued)

*Primary Examiner*—James Trujillo
*Assistant Examiner*—Dawaune Conyers
(74) *Attorney, Agent, or Firm*—Samuel A. Kassatly; Shimokaji & Associates, P.C.

(57) ABSTRACT

A date querying system processes free-form text in documents to identify and locate some or all of the dates in the documents using extended regular expression matching to capture various date formats. The system packages a canonicalized format of each identified date to support various types of queries such as, for example, specific date querying, hierarchical date querying, range date querying, proximity queries comprising a date and any keywords, and any combination of types of queries. The system scans a document to identify the various format dates occurring in the document, disambiguates the resulting occurrences of dates, and canonicalizes the dates according to one or more predetermined formats.

25 Claims, 6 Drawing Sheets

OTHER PUBLICATIONS

Freidl, J. "Mastering Regular Expressions, Second Edition," O'Reilly & Associates, Inc., Sebastopol, CA, 2002.*

Klopping, H. Mesman, Beno. Plomp, P. Schreuder, W. "The LPIC-2 Exam Prep," Sep. 12, 2004.*

Ignat et al., "Extending an Information Extraction tool set to Central and Eastern European languages", Sep. 2003, Proceedings of the International Workshop, pp. 33-39.*

* cited by examiner

SYSTEM AND METHOD FOR SEARCHING DATES EFFICIENTLY IN A COLLECTION OF WEB DOCUMENTS

FIELD OF THE INVENTION

The present invention generally relates to text analysis of electronic documents. More specifically, the present invention relates to identifying dates in electronic documents in which dates occur in various formats and further relates to packaging the dates uniformly for purposes of querying.

BACKGROUND OF THE INVENTION

Searching for dates is a useful primitive in understanding and extracting relevant pieces from large collections of documents. Locating a source date for content on the web is especially useful in determining relevancy to a search request comprising a date. However efficiently performing a query for dates is challenging since dates tend to occur in various formats in unstructured text.

For example, the date October 11, 2004 can occur in text as $11^{th}$ of October 2004, 11-10-2004, 11 October, '04, Oct. $11^{th}$ 04, 11/10/04, 10.11.2004, 2004 Oct 11, etc. Variations in date expression can be even more pronounced on a diversified collection such as the web, where many different people and organizations write web content such as free-form text. This is a natural consequence of the decentralized nature of the web and the few rigid requirements imposed on free-form text.

Nevertheless, the free-form text on the web is an important source of information, both current and archived. Newspapers and magazines provide news articles online on the web; an estimate for news sources on the web is over 10,000. Covering a range of topics, these new articles cater to the needs of both businesses and individuals. Moreover, organizations such as companies and universities post a wealth of information available online. Some search engine sites estimate the number of web pages indexed at over 8 billion. Given the large number of sources and the large number of pages on the web, the need for automated techniques for searching and navigating such a large collection is increasing.

Dates are an important means to understand the temporal context of the information found near the dates or on the same web page as the dates. Queries such as:

Show all pages that mention a particular date D (e.g., 11 Oct 2004),

Show all pages that mention any date in a given month (e.g., Oct 2004), or

Show all pages that mention any date in a given year (e.g., 2004) with one or more keywords with a specified context such as "on the same page", "on the same line", etc. are natural and useful ways to filter and navigate such large collections of pages.

Although conventional web search engines perform well using standard keyword and proximity searches, it would be desirable to present additional improvements. Conventional web search engines do not adequately search by dates. Even a basic date query such as "find all pages that mention $11^{th}$ October 2004" requires a separate search for each possible date format. Such a search is tedious and unmanageable since the number of possible date formats is sizeable. Furthermore, some formats such as 11.10.2004 are difficult to search because some search engines ignore the numbers and periods in a date format if they occur frequently.

Searching on dates using a conventional web search engine becomes more unmanageable for hierarchical date queries such as "find all pages that mention any date in October 2004".

Conventional web search engines have further difficulty searching for dates in ambiguous format. For example, 11.10.2004 can mean either $11^{th}$ October 2004 or $10^{th}$ November 2004, depending on the context. The ambiguity is further compounded when the year is specified as a two-digit number and the month, day, and year are in similar in value (for example, 01/04/05).

Another conventional approach for finding a source date finds a single date for each page, representing when the page may have been written, i.e., a date-of-page. However, this date-of-page may not exist for all web pages. A date-of-page is typically not well defined and is usually a best guess based on different dates that appear on the page or in the http header of the page. Furthermore, this conventional approach still retains only one date per page even when a page contains additional dates. Consequently, the information about other dates is lost, including the locations of the other dates for proximity queries.

A further conventional approach that identifies named entities such as different forms in which a keyword can be referenced in text lists all possible alternatives explicitly. This conventional approach works well in cases where the number of variants is a small number. However, in the context of locating source dates on the web, the large number of possible formats for each date and the large number of possible distinct dates renders this approach cumbersome. Consequently, regular expression-based spotting is a better alternative for dates.

Yet another conventional approach comprises a natural single-step regular expression matching. In particular contexts such as weblogs (also known as blogs), this conventional approach addresses identification of dates to some extent based on the structure of blogs. However, this conventional approach does not address the wide range of possible formats for dates that appear on the web and the resulting disambiguation required to identify dates. Furthermore, efficiency and processing time become serious issues for this conventional approach considering the large number of possible formats and the large number of pages requiring processing.

What is therefore needed is a system, a computer program product, and an associated method for searching dates efficiently in a large collection of web documents. The need for such a solution has heretofore remained unsatisfied.

SUMMARY OF THE INVENTION

The present invention satisfies this need, and presents a system, a computer program product, and an associated method (collectively referred to herein as "the system" or "the present system") for searching dates efficiently in a large collection of web documents.

A date matching module of the present system processes free-form text in documents to identify and locate some or all of the dates in the documents using extended regular expression matching to capture various date formats. A packaging module of the present system packages a canonicalized format of each identified date to support various types of queries such as, for example, specific date querying, hierarchical date querying, range date querying, proximity date querying, proximity queries comprising a date and any keywords, and any combination of types of queries.

The date module scans a document for some or all occurrences of dates, searching for numerical dates and month names in alphabetic format. If a month name is found, a prefix module applies a prefix regular expression matching to a prefix substring preceding the found month name to identify a prefix part of a date, a portion of the date preceding the month name. The suffix module applies a suffix regular expression matching to a suffix substring following the found month name to identify a suffix part of a date, a portion of the date following the month name. The date matching module determines one or more formats for a date corresponding to the found month name by correlating the prefix part and the suffix part. The date matching module generates a date in the selected format(s) from the found month, the prefix part, and the suffix part.

A disambiguator of the present system disambiguates found occurrences of dates comprising either a found numerical date or the date generated by the date matching module. Disambiguation is desired for dates with a day, month, or year that cannot easily be discerned. A canonicalizer formats dates in one or more canonical forms for the disambiguatized occurrences of dates.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Free-form text: Unstructured text such as the input to a word processor or text editor comprising, for example, words, sentences, dates, numbers, etc.

HTML (Hypertext Markup Language): A standard language for attaching presentation and linking attributes to informational content within documents. During a document authoring stage, HTML "tags" are embedded within the informational content of the document. When a web server transmits the web document (or "HTML document") to a web browser, the tags are interpreted by the browser and used to parse and display the document. In addition to specifying how the web browser is to display the document, HTML tags can be used to create hyperlinks to other web documents.

Internet: A collection of interconnected public and private computer networks that are linked together with routers by a set of standard protocols to form a global, distributed network.

World Wide Web (WWW, also Web): An Internet client—server hypertext distributed information retrieval system.

Figure 1:
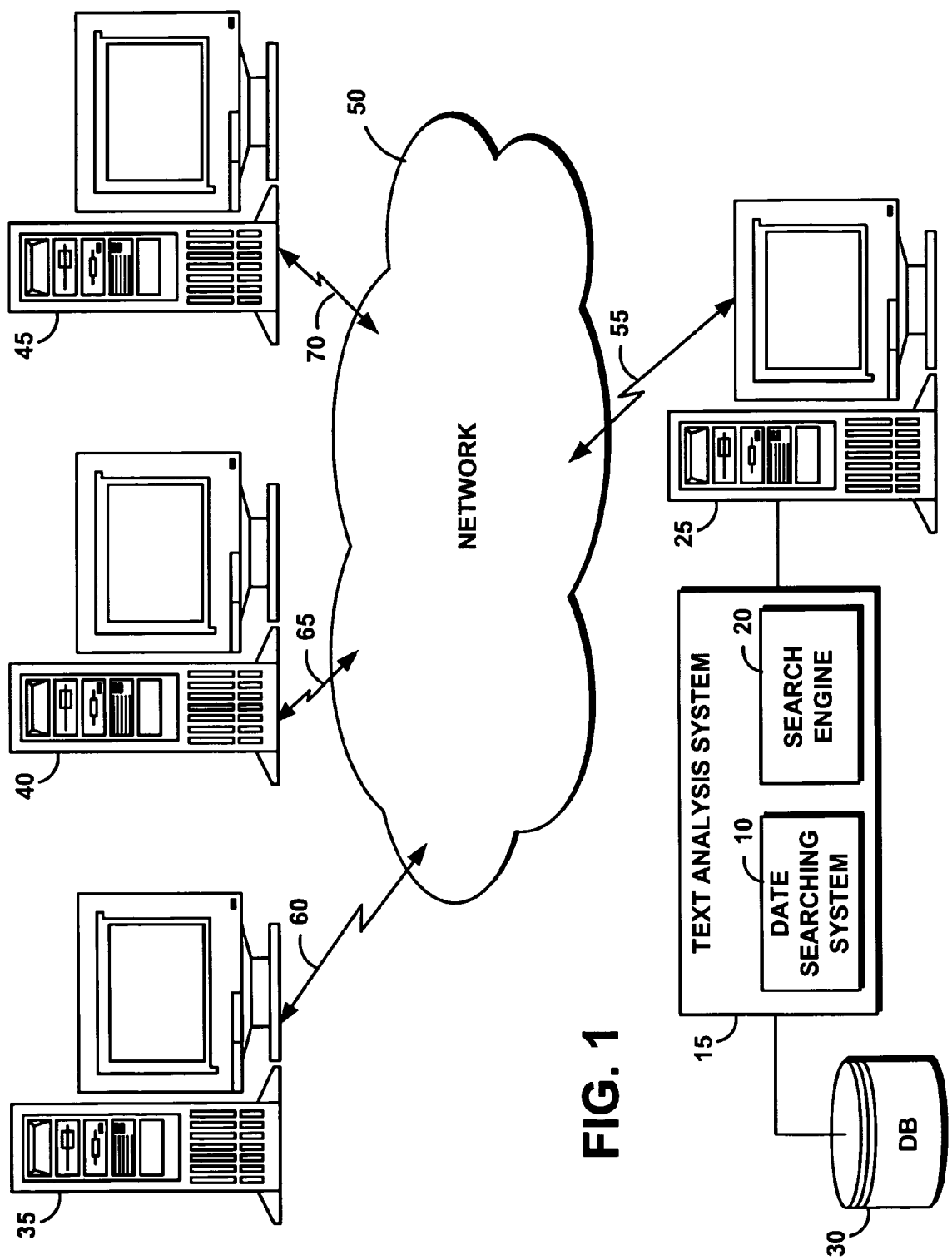
FIG. 1 is a schematic illustration of an exemplary operating environment in which a date searching system of the present invention can be used.

FIG. 1 portrays an exemplary overall environment in which a system, a service, a computer program product, and an associated method (the "date searching system 10" or the "system 10") for searching dates efficiently in a collection of web documents according to the present invention may be used. A text analysis system 15 comprises system 10 and a search engine 20. The text analysis engine 15 analyzes documents obtained from a source such as, for example, the WWW, for data analysis, trend discover, etc. The text analysis engine comprises search functionalities provided by the search engine 20. The text analysis system 15 is installed on a computer such as the host server 25.

System 10 comprises a software programming code or a computer program product that is typically embedded within, or installed on the host server 25. Alternatively, system 10 can be saved on a suitable storage medium such as a diskette, a CD, a hard drive, or like devices. A database 30 (dB 30) comprises documents from sources such as the WWW. While the system 10 will be described in connection with the WWW, the system 10 can be used with a stand-alone dB 30 of content that may have been derived from the WWW or other sources.

Users, such as remote Internet users, are represented by a variety of computers such as computers 35, 40, 45, and can access the host server 25 through a network 50. Computers 35, 40, 45, each comprise software that allows the user to interface securely with the host server 25. The host server 25 is connected to network 50 via a communications link 55 such as a telephone, cable, or satellite link. Computers 35, 40, 45, can be connected to network 50 via communications links 60, 65, 70, respectively. While system 10 is described in terms of network 50, computers 35, 40, 45, may also access system 10 locally rather than remotely. Computers 35, 40, 45, may access system 10 either manually, or automatically through the use of an application. Users query data on dB 30 via network 50 and the search engine 20.

Figure 2:
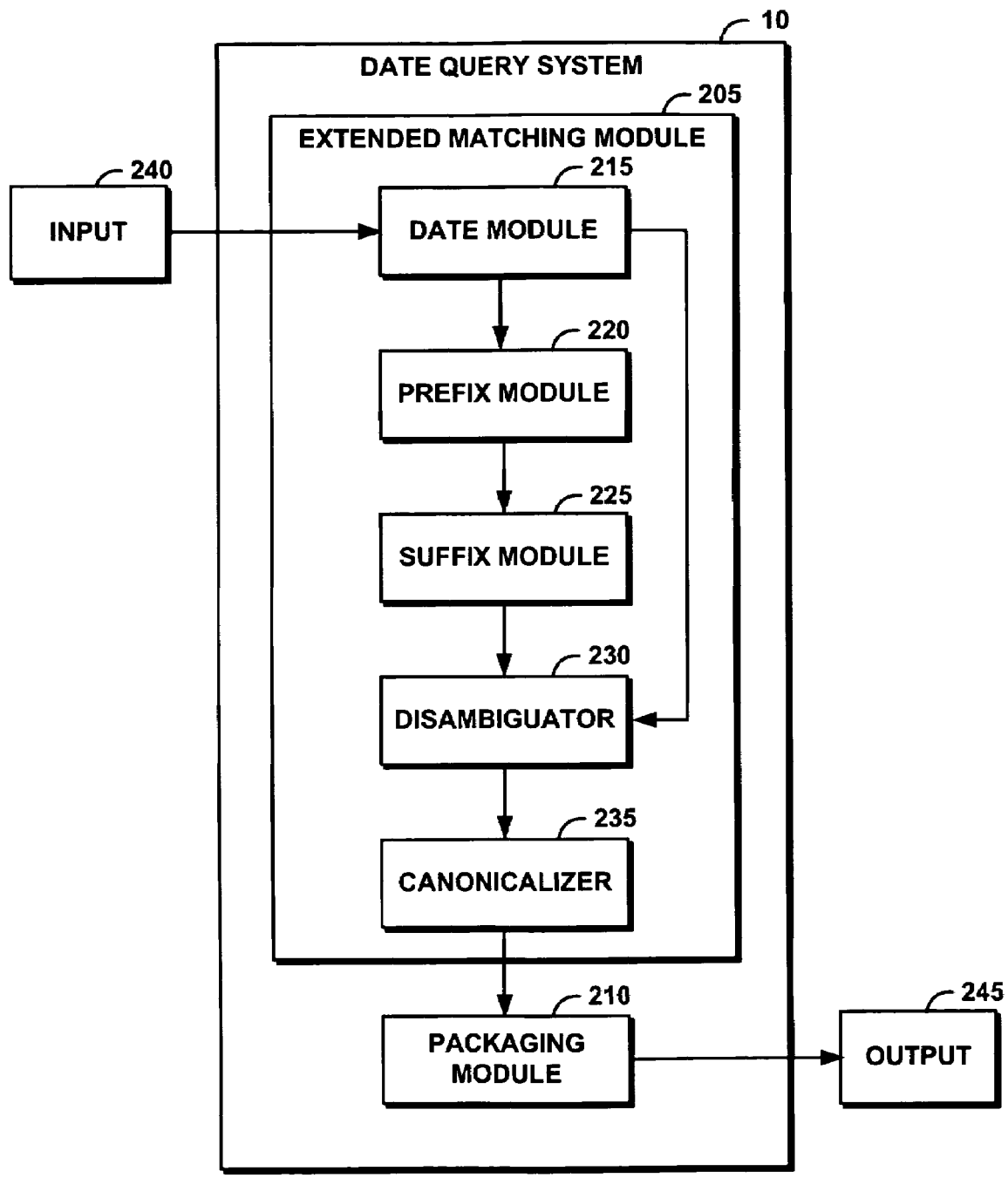
FIG. 2 is a block diagram of the high-level architecture of the date searching system of FIG. 1.

FIG. 2 illustrates a high-level hierarchy of system 10. System 10 comprises an extended matching module 205 and a packaging module 210. The extended matching module 205 comprises a date module 215, a prefix module 220, a suffix module 225, a disambiguator 230, and a canonicalizer 235.

An input 240 comprises documents that have no html tags such as, for example, any content derived from the WWW that has been de-tagged. Data in dB 30 is processed to remove html tags using standard de-tagging methods to remove the html tags from the crawled html content of the document. Removing html tags simplifies a process of spotting a date by removing the complexity of html tags interleaved within a date string. Removing html tags requires reconstruction of the span and location of the occurrence of a date; span and location are required for queries comprising proximity. An output 245 generated by system 10 comprises the span and location of each identified date to support proximity querying.

Figure 3:
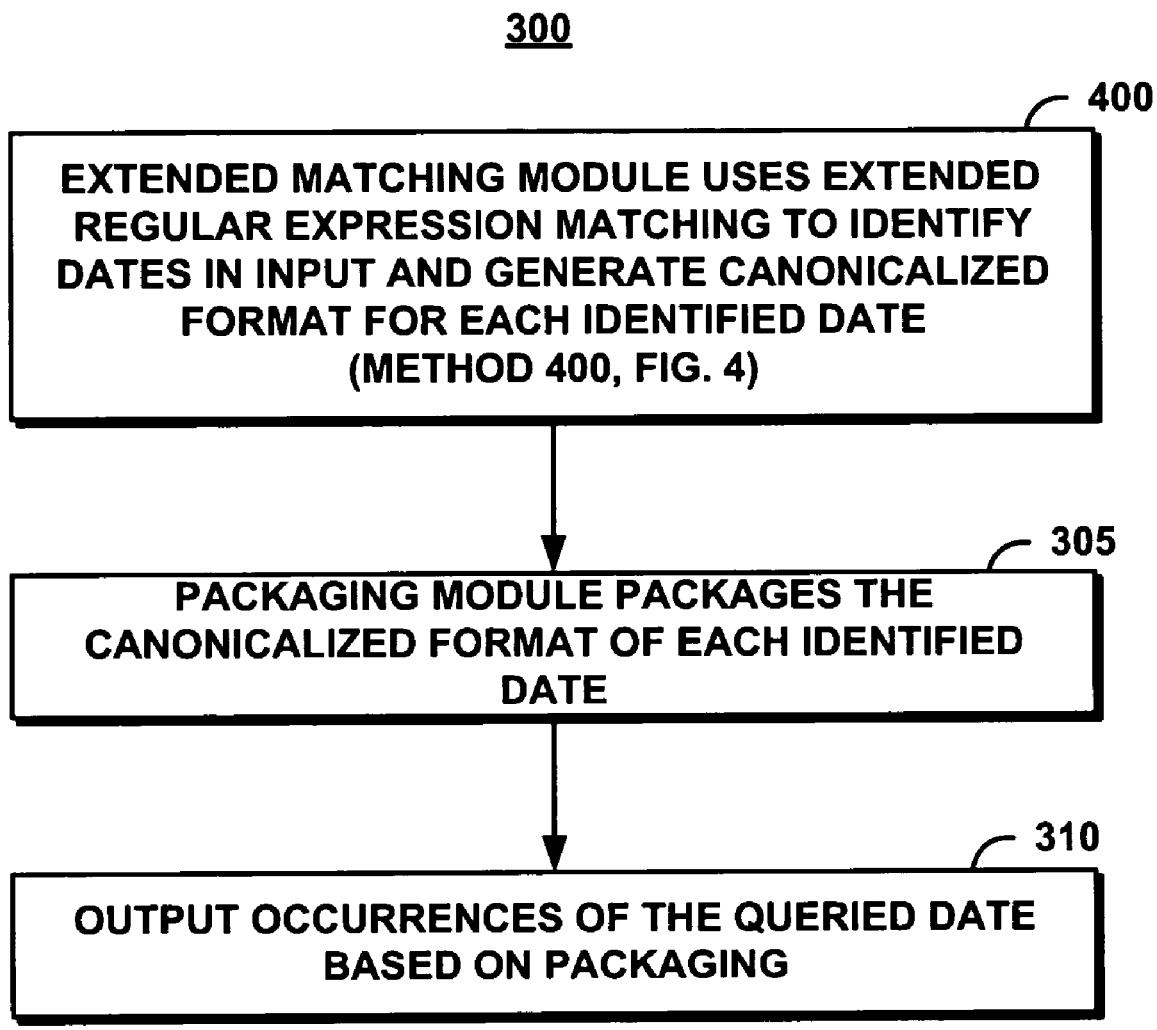
FIG. 3 is a process flow chart illustrating a method of operation of the date searching system of FIGS. 1 and 2.

FIG. 3 illustrates a method 300 of system 10. The extended matching module 205 processes documents in dB 30 to identify and locate some or all of the dates in the document (step 400, further illustrated in method 400 of FIG. 4). The extended matching module 205 uses extended regular expression matching to capture various date formats.

In free-form text, dates can occur either numerically or alphanumerically. Alphanumeric dates occur in forms, such as, for example:

October 11 hh:mm:ss EST 2004

October 11 hh:mm:ss 2004

11 October 2004

October 11 2004

2004 October 11.

In each of these exemplary alphanumeric formats, additional variants result when a day 11 of a month is written with a superscripted "th" as $11^{th}$. In general, a day of a month can be written as $1^{st}$, $2^{nd}$, $3^{rd}$, $4^{th}$, $5^{th}$, etc., or as 1, 2, 3, 4, 5, etc.

The number of possible text formats in which any date may be written alphanumerically is non-trivial. Date format comprises year format, month format, day format, and separator format.

Text representations of years comprise a variety of year formats. For example, a year such as 2004 can be written as 2004, 04, or '04. In general, the year can occur as a full four-digit integer (e.g., 2004), as a two-digit integer (e.g., 04), or as a two-digit integer with a preceding apostrophe (e.g., '04). For disambiguation purposes, system 10 uses a convention specifying that years before 1970 are fully specified with four digits. System 10 interprets two digit years from 00 to 69 as 2000 to 2069. System 10 interprets two digit years from 70 to 99 as 1970 to 1999.

Text representations of a month comprise a variety of month formats. For example, months can be written either spelled out in a complete form or in an abbreviated form such as Oct for October. Months can also be written in any number of languages, either in complete form or abbreviated form. Months can be capitalized, lower case, or uppercase.

Furthermore, incompletely specified alphanumeric formats of dates are common. For example, a date may be represented as a month and year without an accompanying day such as, for example, October 2004 or 2004 October. A date may be further represented as a month and day without an accompanying year such as, for example, October $11^{th}$, $11^{th}$ October, 11 October, or October 11.

Moreover, various characters such as a space, a dash ("-"), a period ("."), a comma (","), etc. may separate components of a date in alphanumeric format.

Numeric dates comprise numeric formats such as, for example:
11/10/2004, 11-10-2004, 11.10.2004,
10/11/2004, 10-11-2004, 10.11.2004, or
2004/10/11, 2004-10-11, 2004.10.11

Components of a date in alphanumeric format may be separated by various characters such as a space, a dash ("-"), a period ("."), an underline ("_"), a forward slash ("/"), etc. In alphanumeric format, a year can comprise two digits (e.g., 04) or four digits (e.g., 2004).

A URL string can comprise dates without any separators between day, month, or year. In this case, the date is written as a numeric string such as, for example, the following dates for October 11, 2004: 11102004, 10112004, or 20041011.

For either alphanumeric dates or numeric dates appearing in html, html tags may be imbedded within a string representing the date. For example the string $11^{th}$ October 2004 may have been written as "$11^{th}$<b> October </b> 2004" to make the month October a bold word.

Figure 4A:
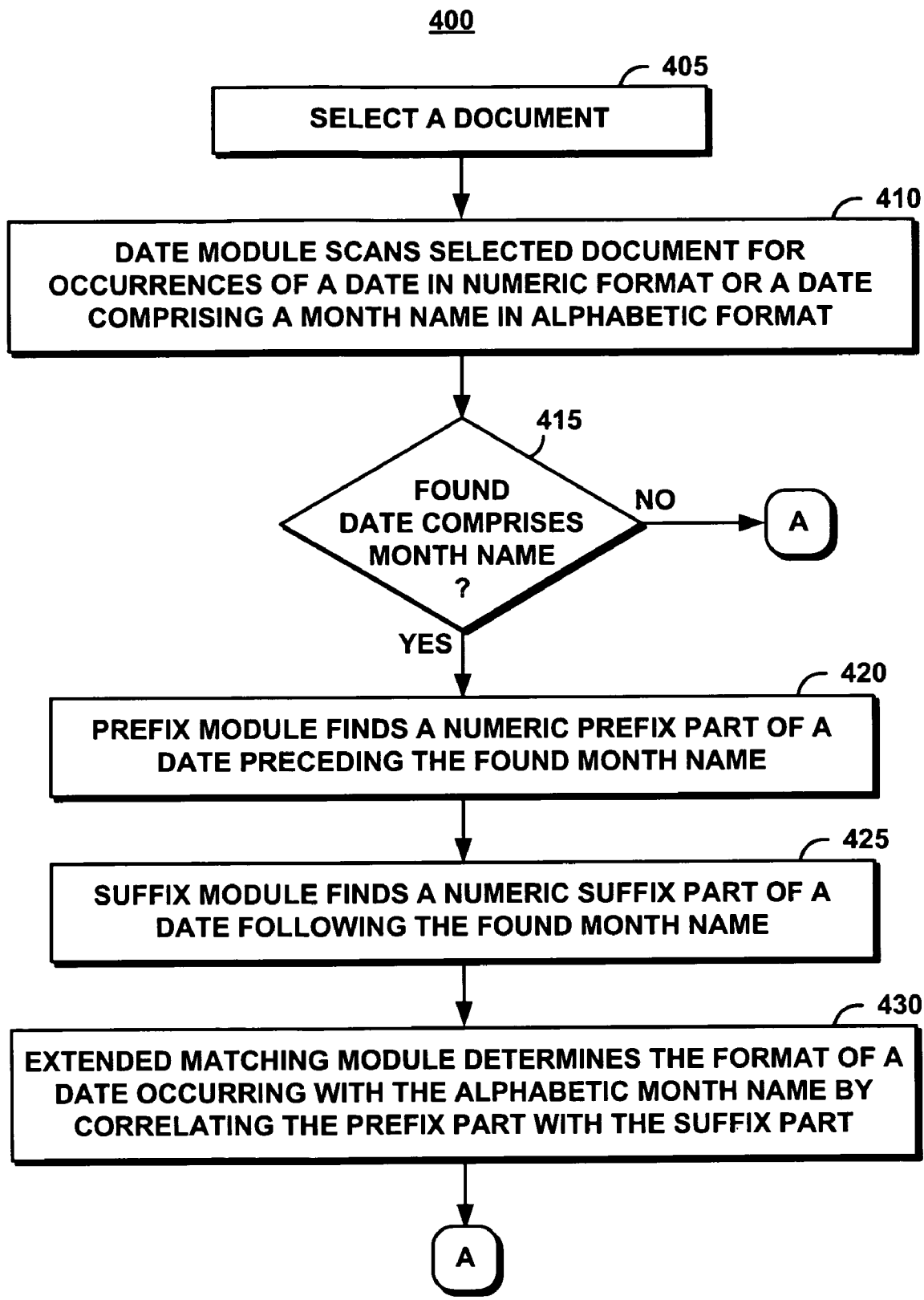
FIG. 4 is comprised of FIGS. 4A and 4B and represents a process flow chart illustrating a method of operation of the date matching module of the date searching system of FIGS. 1 and 2.
Figure 4B:
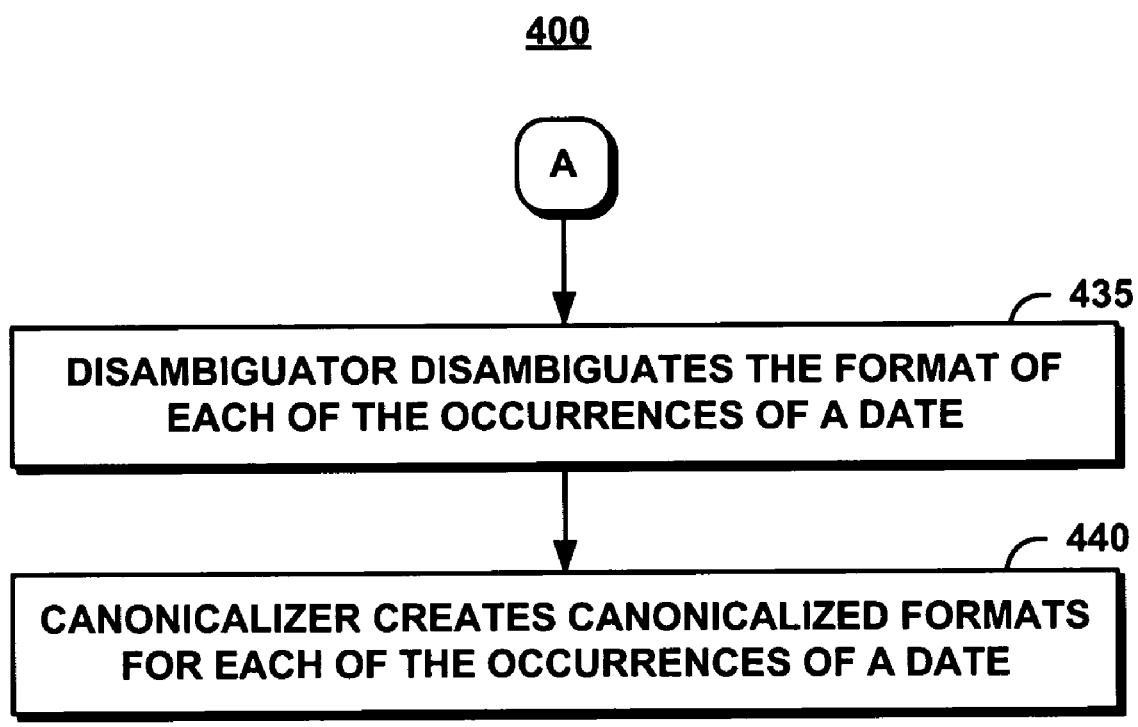

FIG. 4 illustrates a method 400 of the extended matching module 205 of system 10. System 10 selects a document for processing (step 405). The date module 215 scans the selected document for one or more occurrences of a date in numeric format or a date comprising a month name in alphabetic format in either full form or abbreviated form (step 410).

The extended matching module 205 determines whether the found date comprises a month name (decision step 415). A date comprising a month name typically comprises an alphanumeric portion preceding the month name (further referenced as the prefix part) and an alphanumeric portion following the month name (further referenced as the suffix part). If the found date comprises a month name, the prefix module 220 applies a prefix regular expression matching to the characters preceding the found month name to identify the prefix part (step 420). The prefix module 220 captures any possible day-year patterns occurring in a prefix substring of length ranging from 5 characters to 10 characters. An exemplary length of the prefix substring is approximately 10 characters.

The suffix module 225 applies suffix regular expression matching to the characters following the found month name to identify the suffix part (step 425). The suffix module 225 captures any possible day-year patterns occurring in a suffix substring of length ranging from 10 characters to 30 characters. An exemplary length of the suffix substring is approximately 20 characters.

The extended matching module 205 determines one or more formats for the date comprising the month name by correlating the prefix part and the suffix part (step 435). The extended matching module 205 appropriately handles any overlapping dates. For example, a string "2003 Oct 11, 2004" may represent "2003 Oct 11" and "Oct 11 2004".

If the found date comprises a numeric format (decision step 425), the disambiguator 230 disambiguates the format of each of the found occurrences of dates (step 435). Input to the disambiguator 230 comprises a date in numeric format found in step 410 or a date generated from a prefix part, a month name, and a suffix part in step 430.

Ambiguities arise both with numeric date (e.g., 11.10.2004) and alphanumeric date (e.g., 02 October 04) in that the day, month, or year may not be easily discerned. The disambiguator 230 checks ranges values of the portions of the date to reduce ambiguity. For example, a number greater than 12 is either a day or year since each year contains 12 months. Similarly, a number greater than 31 is a year since the maximum number of days in a month is 31.

The disambiguator 230 uses information from a page on which a date if found to further disambiguate a date, if necessary. For example, another date on a page with an unambiguous date may provide a clear indication of the date format. A page may comprise date 9.10.2004; this date can be either October 9, 2004 or September 10, 2004. By examining other dates on the same page, the disambiguator 230 may find the date 15.10.2004; this date can only be October 15, 2004. Consequently, the format for dates on this page is dd.mm.yyyy. The disambiguator 230 extrapolates and infers that the format of the currently selected date is similar to that of other dates on the selected page, assuming that a given page uses the same format throughout.

Disambiguator 230 applies additional rules as desired to further disambiguate a date. Disambiguator 230 applies these additional rules based on continuity in the page. For example, a date on a page comprising 08.10.2004, 11.10.2004, and 04.10.2004 likely comprises format dd.mm.yyyy Disambiguator 230 further applies additional rules based on dates compared to past/future. For example, if one interpretation of a date is after the current crawled date for a collection of documents in which the selected document resides, then the interpretation is rejected. Disambiguator 230 applies additional rules based on recency and closeness. If possible interpretations of dates are less than the crawled date, then the date interpretation that is closer to the crawl date is selected. For example, a page crawled in december 2004 lists a date 01 october 04. The disambiguator 230 interprets the date 01 october 04 as 1st October 2004 instead of 4th October 2001.

In one embodiment, the disambiguator 230 uses site-level information as available. The disambiguator 230 gathers date format information from one or more pages of a site and uses the gathered date information for other pages where a date is ambiguous.

The canonicalizer 235 takes the month, day, and year determined by the disambiguator 230, and represents the date in a canonicalized form as MMM-dd-yyyy (step 430).

The packaging module 210 packages the canonicalized format of each identified date (step 305) to, for example, support specific date querying, hierarchical date querying, and range date querying. Specific date querying queries content for documents comprising a specific date; an exemplary specific date query is:

"Show all pages that mention a particular date D (e.g., 11 Oct 2004)". Hierarchical date querying queries content for documents comprising a month, a month and year, or a year; exemplary hierarchical date queries are:

Show all pages that mention any date in a given month (e.g., Oct 2004), or

Show all pages that mention any date in a given year (e.g., 2004) Range date querying queries content for documents comprising a range of dates; an exemplary range date query is:

Show all pages that mention any date between two dates (e.g., 11 Oct 2004 and 22 Oct 2004).

The packaging module 210 packages the canonicalized date in the following formats: [[MMM-dd-yyyy]], [[MMM-yyyy]], [[yyyy]], and a 32-bit integer. The first format [[MMM-dd-yyyy]] assists in performing specific date querying, the second and third formats [[MMM-yyyy]], [[yyyy]] assist in performing hierarchical date querying, and the fourth format assists in performing date range querying.

For example, to search for all occurrences of a specific date such as 11$^{th}$ October 2004 in a specific date query, a user requests [[Oct-11-2004]]. This query returns occurrences of the requested date in all formats including 11.10.2004, 11-10-04, 2004 oct. 11, etc. Similarly, to search for occurrences of any date in October 2004 in a hierarchical query, the user requests [[Oct-2004]]. To search for any date in 2004, the user requests [[2004]].

The packaging module 210 further packages the canonicalized format of each identified date (step 305) to, for example, support proximity queries comprising a date and any other keywords. Support of proximity queries requires knowledge of the location of a date in a document, a span of the date, and a span associated with words in some or all of the documents in the input 240. A span comprises a count of the number of tokens in the date or in a phrase. In one embodiment, the canonicalized format of a date generated by the packaging module 210 comprises the location of the date within a document. In another embodiment, the canonicalized format of a date generated by the packaging module 210 comprises the span of the date within a document.

The packaging module 210 further packages the canonicalized format of each identified date (step 305) to, for example, support proximity queries comprising dates and any other keywords with any other type of date querying such as, for example, specific date querying, hierarchical date querying, and range date querying.

System 10 supports date querying of dB 30, outputting all occurrences of a queried date using the packaging generated by the packaging module 210 (step 310).

Exemplary canonical packages comprise [[MMM-dd-yyyy]], [[MMM-yyyy]], [[yyyy]], and as a 32-bit integer. The canonicalizer 235 indexes the formatted date according to the canonical forms. For example, the canonicalizer 235 indexes 11$^{th}$ October 2004 as indexed as Oct-11-2004, Oct-2004, and 2004. Indexing a date in canonical forms allows the date to match specific queries and hierarchical queries. Each date will be converted to integers using, for example, 11 bits for the year, 4 bits for the month, and 5 bits for the day. These 20 bits are packaged as a 32-bit integer.

A date ambiguity not resolved by the disambiguator 230 is indexed for each possible interpretation, allowing any interpretations of the ambiguous date to match a corresponding user query. Indexing ambiguous dates increases recall for the user.

Figure 5:
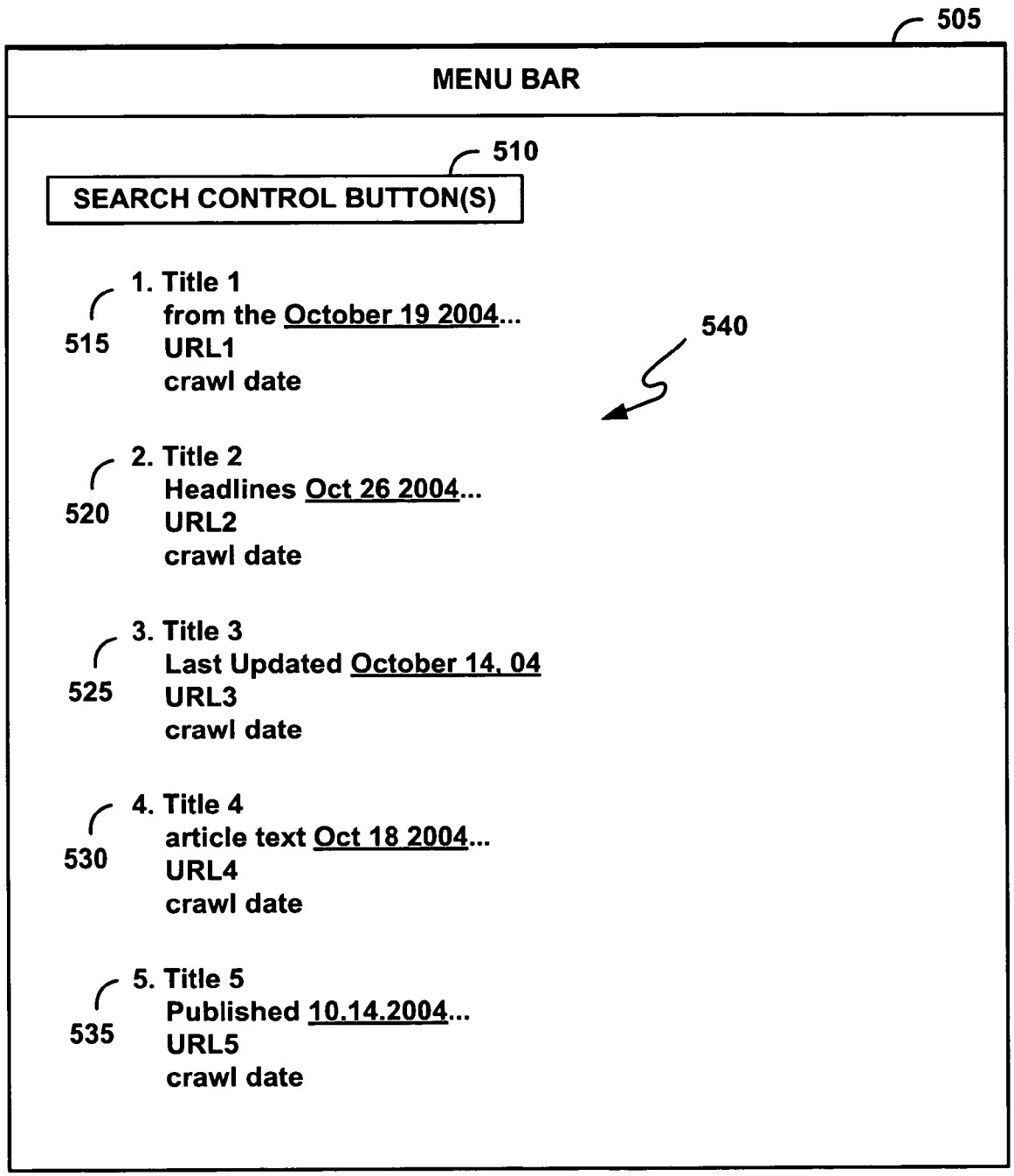
FIG. 5 is a diagram illustrating an exemplary screen shot of a response to a query by a user submitted to a search engine comprising the date searching system of FIGS. 1 and 2.

FIG. 5 illustrates an exemplary screenshot 500 displaying results of a single query for "all dates in Oct-2004". The screenshot 500 comprises a menu bar 505 and one or more search control button(s) 510. Listed in the screenshot 500 are exemplary query responses 515, 520, 525, 530, 535 (collectively referenced as query responses 540). Additional query responses may be found by the query but not shown in screenshot 500.

As seen in query responses 540, system 10 identifies dates in a variety of forms and packages the dates such that the dates can be found by a simple query. Exemplary query response 515 comprises a date displayed as October 19 2004. Exemplary query response 520 comprises a date displayed as Oct 26, 2004. Exemplary query response 3 comprises a date displayed as October 14, 2004. Exemplary query response 5 comprises a date displayed as 10.14.2004. The month in each of the dates in the query responses 540 is emphasized in some form such as, for example, bold font, italicized font, underlining (as shown), etc.

It is to be understood that the specific embodiments of the invention that have been described are merely illustrative of certain applications of the principle of the present invention. Numerous modifications may be made to the system and method for searching dates efficiently in a collection of web documents described herein without departing from the spirit and scope of the present invention.

What is claimed is:

1. A method of indexing every date occurrence in a plurality of crawled webpage documents, each crawled webpage document containing free-form text, the method comprising the steps of:

creating a secure internet connection for a user to monitor the crawled webpage documents;

removing html tags from crawled html content of one of the crawled webpage documents;

identifying a date occurrence within a selected document from the plurality of crawled webpage documents without reference to information external to the free-form text comprising the selected document and without reference to contextual information within the free-form text, said date occurrence occurring in one or more formats selected from a group of alphanumerical and numerical data formats, wherein said alphanumerical format includes at least one alphabetic representation and said numerical format includes a string of numerical values;

reconstructing a span and location of the occurrence of the date after removal of html tags from the crawled html content of the document;

disambiguating the date occurrence to provide a disambiguated date comprising a first date for the date occurrence and a second date for every ambiguous interpretation of the date occurrence that cannot be resolved as the first date, said disambiguating comprising at least one of:

gathering date format information from one or more pages of a web site and using gathered date format information to resolve the date occurrence;

checking ranges of portions of said date occurrence to identify a format of said date occurrence;

recognizing overlapping dates by matching formats for the date occurrence;
resolving superscripted dates for the date occurrence;
utilizing related information contained on a same page or different pages in said selected document to extrapolate a format of said date occurrence;
utilizing a recency criterion with regard to similar date occurrences in said document to identify a format of said date occurrence; and
gathering a plurality of data format information among a plurality of documents to determine a date-occurrence format;
generating a plurality of canonicalized formats for each disambiguated date;
packaging the plurality of canonicalized formats corresponding to each disambiguated date as a package that indexes the date occurrence;
indexing the ambiguated date occurrences that are not resolved, matching the ambiguated date occurrences to possible interpretations; and
storing the package in a database;
wherein every data occurrence within every crawled webpage document corresponds to a unique package in the database.

2. The method of claim 1 wherein identifying a date occurrence within a selected document comprises
applying extended two-phase regular expression matching to the free-form text of the selected document to find a date occurrence with a date format, the date format comprising at least one format selected from a group comprising a day format, a month format, a year format, a separator format.

3. The method of claim 2 wherein applying comprises using the extended regular expression matching to identify each complete numeric date and to identify each alphabetic month name occurring in the document the date format comprises a month format that includes an alphabetic month name.

4. The method of claim 3 wherein the step of applying extended two-phase regular expression matching to the free-form text further comprises the step of:
a second phase applying a prefix regular expression matching to find a prefix part of the date occurrence proceeding the alphabetic month name to capture day-year patterns within the prefix; a second phase applying a suffix regular expression matching to find a suffix part of the date occurrence following the alphabetic month name to capture day-year patterns within the suffix, if an alphabetic month name is identified; and
correlating the prefix part and the suffix part to determine the format day format and the year format.

5. The method of claim 1 wherein the canonicalized format is selected from a group consisting of a canonical format to support specific date querying, a canonical format to support hierarchical querying, a canonical format to support range date querying, and a canonical format to support proximity date querying, wherein hierarchical date querying comprises querying for documents with a month, a month and year, or a year.

6. The method of claim 5 wherein the canonical format to support proximity date querying further comprises incorporating the location and span of the date occurrence, wherein the span comprises a count of the number of tokens in a date or in a phrase.

7. The method of claim 1 wherein the canonicalized format supports proximity date querying in combination with a second type of date querying of date querying selected from a group comprising specific date querying, hierarchical date querying, and range date querying.

8. The method of claim 7 wherein the location and span of the date occurrence is included in the package.

9. The method of claim 1, wherein the date occurrence is an alphanumeric string having a format selected from the group consisting of a day format, a year format, a separator format, and combinations of these formats.

10. The method of claim 9, wherein the month format is an alphabetic string corresponding to a month name in a language.

11. A computer program product having program codes stored on a computer-usable medium for searching for all occurrences of a queried date in a plurality of electronic documents, the method comprising:
a program code for processing each of the electronic documents via extended regular expression matching to generate a canonicalized format of each occurrence of any date in any date format in the document;
a program code for packaging the canonicalized format of each occurrence to support one or more types of date querying;
a program code for reconstructing a span and location of one of the occurrences of the queried date after removal of html tags from crawled html content of one of the electronic documents; and
a program code for outputting all occurrences of the queried date using the packaged canonicalized format.

12. The computer program product of claim 11 further comprising:
a program code for scanning the document for all occurrences of all date in any date format in the document;
a program code for disambiguating the format of each of the occurrences; and
a program code for creating the canonicalized format for each of the disambiguated occurrences.

13. The computer program product of claim 12 wherein the program code for scanning applies extended regular expression matching to the content of the document to find all occurrences of all dates in any date format in the document.

14. A processor-implemented service for searching for all occurrences of a queried date in a plurality of electronic documents, the service comprising:
receiving the electronic documents;
invoking an autonomic hardware configuration utility, wherein the electronic documents are made available to the autonomic hardware configuration utility for automatically searching for all occurrences of the queried date by:
processing each of the electronic documents via extended regular expression matching to generate a canonicalized format of each occurrence of any date in any date format in the document;
packaging the canonicalized format of each occurrence to support one or more types of date querying;
processing a reconstruction of a span and location of one of the occurrences of the queried date after removal of html tags from crawled html content of one of the electronic documents; and
outputting all occurrences of the queried date using the packaged canonicalized format.

15. The service of claim 14 wherein:
scanning the document for all occurrences of all dates in any date format in the document;
disambiguating the format of each of the occurrences; and
creating the canonicalized format for each of the disambiguated occurrences.

16. The service of claim 15 wherein scanning comprises applying extended regular expression matching to the content of the document to find all occurrences of all dates in any date format in the document.

17. The service of claim 16 wherein applying comprises using the extended regular expression matching to identify each complete numeric date and to identify each alphabetic month name occurring in the document.

18. The service of claim 17 further comprising, if an alphabetic month name identified:
- applying a prefix regular expression matching to find a prefix part of a date before the alphabetic month name;
- applying a suffix regular expression matching to find a suffix part of a date after the month name; and
- correlating the prefix part and the suffix part to determine the format of a date occurring with the alphabetic month name.

19. The service of claim 14 wherein packaging comprises structuring the canonicalized format of each occurrence to support specific date querying.

20. The service of claim 14 wherein packaging comprises structuring the canonicalized format of each occurrence to support hierarchical date querying.

21. The service of claim 14 wherein packaging comprises structuring the canonicalized format of each occurrence to support range date querying.

22. The service of claim 14 wherein packaging comprises structuring the canonicalized format of each occurrence to support proximity date querying.

23. The service of claim 14 wherein structure comprises incorporating the location and span of the occurrence with the canonicalized format.

24. The service of claim 12 wherein the packaging comprises structuring the canonicalized format of each occurrence to support proximity date querying in combination with a second type of date querying, wherein the second type of date querying is selected from the group comprising specific date querying, hierarchical date querying, and range date querying.

25. The service of claim 12 wherein structuring comprises incorporating the location and span of the occurrence with the canonicalized format.

\* \* \* \* \*